US012562854B2

(12) United States Patent

Teague et al.

(10) Patent No.: US 12,562,854 B2

(45) Date of Patent: Feb. 24, 2026

(54) COLLECTING DUPLICATED PACKETS FROM A PLURALITY OF NODES BASED ON A TRAFFIC PROFILE

(71) Applicant: Charter Communications Operating, LLC, St. Louis, MO (US)

(72) Inventors: Christopher Teague, Castle Pines, CO (US); Nad Weyer, Centennial, CO (US); Timothy Bleidorn, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 469 days.

(21) Appl. No.: 17/885,212

(22) Filed: Aug. 10, 2022

(65) Prior Publication Data

US 2024/0056236 A1     Feb. 15, 2024

(51) Int. Cl.
| | |
|---|---|
| *H04L 1/1867* | (2023.01) |
| *H04L 41/22* | (2022.01) |
| *H04L 43/062* | (2022.01) |
| *H04L 43/12* | (2022.01) |

(52) U.S. Cl.
CPC ............ *H04L 1/189* (2013.01); *H04L 43/062* (2013.01); *H04L 43/12* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 2006/0029075 A1* | 2/2006 | Sheppard ................ | H04L 67/30 |
| | | | 370/428 |
| 2013/0054737 A1* | 2/2013 | Miranda ................. | H04L 43/12 |
| | | | 709/224 |
| 2020/0403826 A1* | 12/2020 | Dawani ............... | H04L 12/4633 |
| 2021/0218673 A1* | 7/2021 | Ma ........................ | H04L 49/208 |
| 2023/0188598 A1* | 6/2023 | Dawani ............... | H04L 67/1095 |
| | | | 709/224 |

* cited by examiner

*Primary Examiner* — Ayaz R Sheikh
*Assistant Examiner* — Christopher R Davis
(74) *Attorney, Agent, or Firm* — Dority & Manning, P.A.

(57)     ABSTRACT

A method for collecting duplicated packets from a plurality of nodes provided on a network includes receiving a traffic profile which includes one or more parameters of packets which are to be captured by the plurality of nodes. The method further includes transmitting the traffic profile to each of the plurality of nodes provided on the network and receiving duplicated packets from the plurality of nodes. The duplicated packets correspond to packets which have been duplicated from packets which are captured by the plurality of nodes and satisfy the traffic profile.

20 Claims, 9 Drawing Sheets

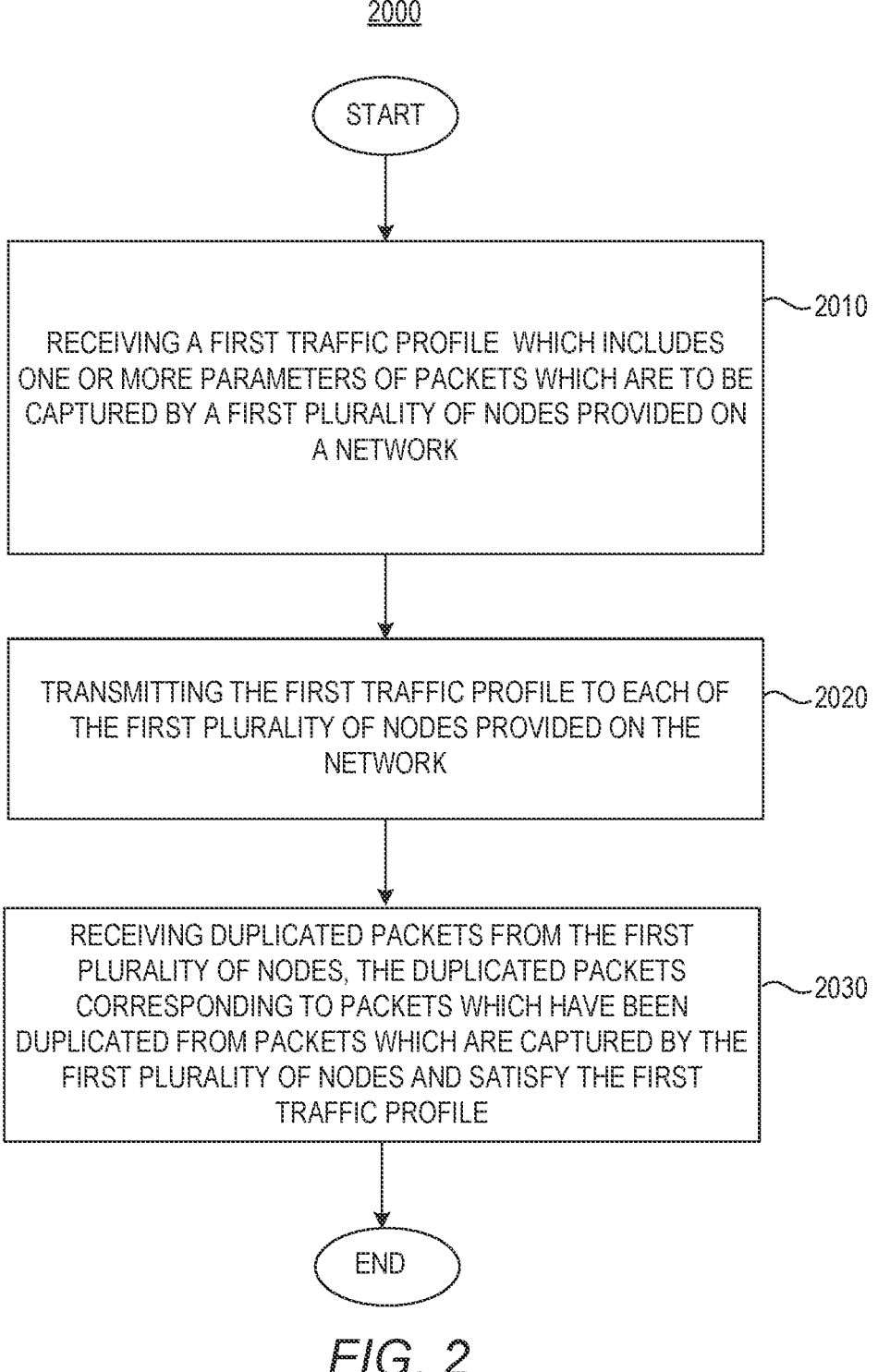

2000

START

RECEIVING A FIRST TRAFFIC PROFILE  WHICH INCLUDES ONE OR MORE PARAMETERS OF PACKETS WHICH ARE TO BE CAPTURED BY A FIRST PLURALITY OF NODES PROVIDED ON A NETWORK ~2010

TRANSMITTING THE FIRST TRAFFIC PROFILE TO EACH OF THE FIRST PLURALITY OF NODES PROVIDED ON THE NETWORK ~2020

RECEIVING DUPLICATED PACKETS FROM THE FIRST PLURALITY OF NODES, THE DUPLICATED PACKETS CORRESPONDING TO PACKETS WHICH HAVE BEEN DUPLICATED FROM PACKETS WHICH ARE CAPTURED BY THE FIRST PLURALITY OF NODES AND SATISFY THE FIRST TRAFFIC PROFILE ~2030

END

| | | | | |
|---|---|---|---|---|
| CONFIG X | NODE 1 | TRAFFIC PROFILE A | DESTINATION D | START G, END H |
| CONFIG X | NODE 2 | TRAFFIC PROFILE A | DESTINATION D | START G, END H |
| CONFIG X | NODE 3 | TRAFFIC PROFILE A | DESTINATION D | START G, END H |
| CONFIG Y | NODE 4 | TRAFFIC PROFILE B | DESTINATION E | START J, END K |
| CONFIG Y | NODE 5 | TRAFFIC PROFILE B | DESTINATION E | START J, END K |
| CONFIG Y | NODE 6 | TRAFFIC PROFILE B | DESTINATION E | START J, END K |
| CONFIG Z | NODE 1 | TRAFFIC PROFILE C | DESTINATION F | START L, END M |
| CONFIG Z | NODE 2 | TRAFFIC PROFILE C | DESTINATION F | START L, END M |
| CONFIG Z | NODE 3 | TRAFFIC PROFILE C | DESTINATION F | START L, END M |

5010 — (rows 1-3)
5020 — (rows 4-6)
5030 — (rows 7-9)

*FIG. 5*

COLLECTING DUPLICATED PACKETS FROM A PLURALITY OF NODES BASED ON A TRAFFIC PROFILE

BACKGROUND

Users of a network system, such as an administrator, monitor network traffic to detect and correct errors or anomalies which may occur with respect to packets which are transmitted between nodes provided on the network. Comprehensive packet capture views are helpful for troubleshooting errors which may occur with respect to packets which are associated with an application which is provided via a service provider.

SUMMARY

The disclosure relates generally to collecting duplicated packets from a plurality of nodes provided on a network, based on a traffic profile which defines filter criteria for capturing packets at the plurality of nodes. More particularly, the disclosure relates to a server computing system which provides a graphical user interface (e.g., via a portal) by which a user can define one or more traffic profiles, transmit the one or more traffic profiles to each of the plurality of nodes, and receive at a data collector duplicated packets from the plurality of nodes. The duplicated packets correspond to packets which have been duplicated from packets which are captured by the plurality of nodes and satisfy the traffic profile.

According to an example of the disclosure a method for collecting duplicated packets from a plurality of nodes provided on a network includes receiving a first traffic profile which includes one or more parameters of packets which are to be captured by a first plurality of nodes provided on a network, transmitting the first traffic profile to each of the first plurality of nodes provided on the network, and receiving duplicated packets from the first plurality of nodes, the duplicated packets corresponding to packets which have been duplicated from packets which are captured by the first plurality of nodes and satisfy the first traffic profile.

In some implementations, the one or more parameters include at least one of a port, a protocol, or an attribute associated with the packets.

In some implementations, the method includes providing a user interface, for presentation on a display of a computing device, to display the first plurality of nodes provided on the network, and receiving a selection of the first plurality of nodes as nodes from the network which are to receive the first traffic profile, via the user interface. Receiving the first traffic profile may further include receiving a selection of the one or more parameters to define the first traffic profile, via the user interface.

In some implementations, the method includes receiving, via the user interface, information indicating a period of time during which the first plurality of nodes are to duplicate packets which are captured by the first plurality of nodes and satisfy the first traffic profile, the period of time including a start time and an end time.

In some implementations, the method includes transmitting the first traffic profile to the first plurality of nodes at the start time.

In some implementations, receiving the duplicated packets from the first plurality of nodes comprises receiving, by a data collector via a network tunnel, the duplicated packets from the first plurality of nodes.

In some implementations, the method includes indexing the duplicated packets according to metadata of the duplicated packets, the metadata of the duplicated packets including at least one of a source internet protocol (IP) address, a destination IP address, a source port, or destination port, associated with each of the duplicated packets, and generating pointers for a database referencing the duplicated packets, based on the indexing.

In some implementations, the method includes providing a user interface, for presentation on a display of a computing device, to present data associated with the duplicated packets based on the pointers for the database, and outputting real-time information associated with duplicated packets of a first node among the first plurality of nodes in response to receiving a selection, via the user interface, of the first node.

In some implementations, the method includes providing a user interface, for presentation on a display of a computing device, to present data associated with the duplicated packets based on the pointers for the database, and outputting information for a previous time-period associated with duplicated packets of a first node among the first plurality of nodes in response to receiving a selection, via the user interface, of the first node and of the previous time-period.

In some implementations, the method includes receiving a second traffic profile which includes one or more parameters of packets which are to be captured by a second plurality of nodes provided on the network, at least partially concurrently with packets which are to be captured by the first plurality of nodes provided on the network, transmitting the second traffic profile to each of the second plurality of nodes provided on the network, and receiving duplicated packets from the second plurality of nodes, the duplicated packets corresponding to packets which have been duplicated from packets which are captured by the second plurality of nodes and satisfy the second traffic profile.

In some implementations, the method includes providing a user interface, for presentation on a display of a computing device, to receive a selection of a destination internet protocol (IP) address associated with a data collector which is to receive the duplicated packets from the first plurality of nodes and the duplicated packets from the second plurality of nodes, and transmitting the destination IP address associated with the data collector to each of the first plurality of nodes and the second plurality of nodes provided on the network.

In some implementations, the first traffic profile is associated with packets relating to user plane traffic, and the second traffic profile is associated with packets relating to control plane traffic.

In some implementations, the method includes providing, for presentation on a display device of a computing device, a portal including a user interface configured to receive a selection of the one or more parameters to define the first traffic profile.

According to an example of the disclosure, a server computing system includes: a data collector, at least one memory configured to store instructions, and at least one processor configured to execute the instructions stored in the at least one memory to: receive a traffic profile which includes one or more parameters of packets which are to be captured by a plurality of nodes provided on a network, transmit the traffic profile to each of the plurality of nodes provided on the network, and receive, at the data collector, duplicated packets from the plurality of nodes, the duplicated packets corresponding to packets which have been duplicated from packets which are captured by the plurality of nodes and satisfy the traffic profile.

In some implementations, the one or more parameters include at least one of a port, a protocol, or an attribute associated with a packet.

In some implementations, the at least one processor is configured to: provide a user interface, for presentation on a display of a computing device, to display the plurality of nodes provided on the network, receive a selection of the one or more parameters to define the traffic profile, via the user interface, receive a selection of the plurality of nodes as nodes from the network which are to receive the traffic profile, via the user interface, receive a selection setting a period of time during which the plurality of nodes are to duplicate packets which are captured by the plurality of nodes and satisfy the traffic profile, via the user interface, wherein the period of time includes a start time and an end time, and receive a selection of a destination internet protocol (IP) address associated with the data collector, via the user interface.

In some implementations, the at least one processor is configured to: transmit the destination IP address associated with the data collector to each of the plurality of nodes, transmit the traffic profile to the plurality of nodes at the start time, and transmit information to the plurality of nodes at the end time instructing each of the plurality of nodes to stop duplicating packets based on the traffic profile.

In some implementations, the server computing system further comprises a database, and the at least one processor is configured to: index the duplicated packets received by the data collector according to metadata of the duplicated packets, the metadata of the duplicated packets including at least one of a source internet protocol (IP) address, a destination IP address, a source port, or destination portion, associated with each of the duplicated packets, and generate pointers for the database referencing the duplicated packets received at the data collector, based on the indexing of the duplicated packets.

In some implementations, the at least one processor is configured to: provide a user interface, for presentation on a display of a computing device, to present data associated with the duplicated packets received by the data collector based on the pointers for the database, and output real-time information associated with duplicated packets of a node among the plurality of nodes, in response to receiving a selection via the user interface selecting the node, or output information for a previous time-period associated with duplicated packets of the node among the plurality of nodes, in response to receiving a selection, via the user interface, of the node and the previous time-period.

According to an example of the disclosure, a non-transitory computer-readable storage medium includes executable instructions configured to cause one or more processor devices of a server computing system to: receive a traffic profile which includes one or more parameters of packets which are to be captured by a plurality of nodes provided on a network; transmit the traffic profile to each of the plurality of nodes provided on the network; and receive duplicated packets from the plurality of nodes, the duplicated packets corresponding to packets which have been duplicated from packets which are captured by the plurality of nodes and satisfy the traffic profile.

In some implementations, the non-transitory computer-readable storage medium includes executable instructions configured to cause one or more processor devices of the server computing system to implement any of the operations of the methods disclosed herein.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is an example method for collecting duplicated packets from a plurality of nodes, according to some implementations of the disclosure.

FIG. 5 is an example illustration of configurations of traffic profiles suitable for collecting duplicated packets from a plurality of nodes, according to some implementations of the disclosure.

DETAILED DESCRIPTION

Figure 1:
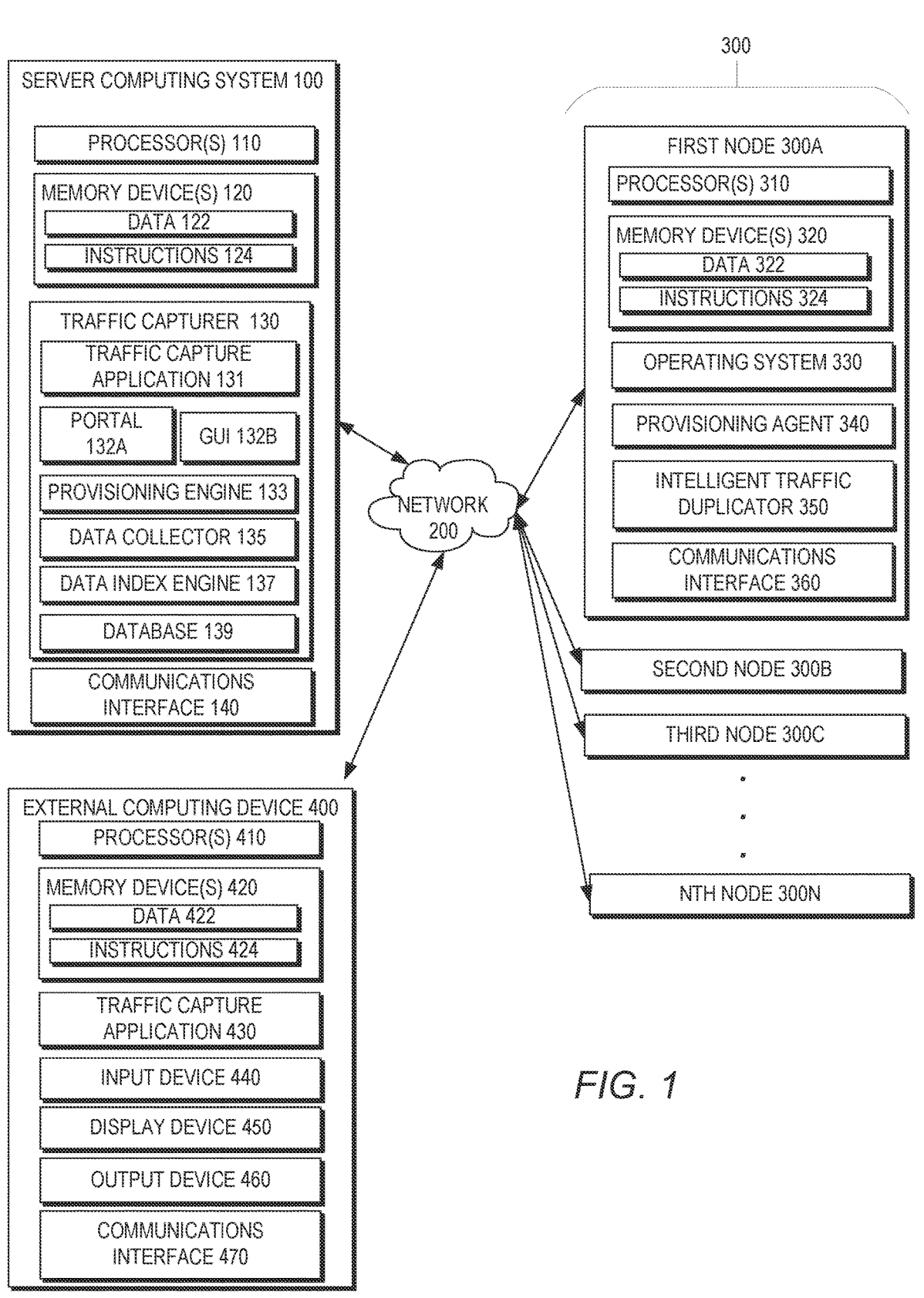
FIG. 1 is an example block diagram of an environment suitable for collecting duplicated packets from a plurality of nodes, according to some implementations of the disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of operations. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

Comprehensive packet capture views are helpful for troubleshooting errors which may occur with respect to packets which are associated with an application which is provided via a service provider. Obtaining a packet capture from a single point in the network is known. However, performing a packet capture across many nodes in a network, merging the data to a centralized location, and locating a particular traffic flow that will assist in the active troubleshooting effort can be extremely cumbersome and is not a straightforward process. In addition, capturing packets from many points in the network often leads to excessively large packet capture file sizes which slow down troubleshooting efforts due to lengthy file transfer times and increased bandwidth usage and use of computer resources.

According to one or more examples disclosed herein, a distributed packet capture can be achieved over a large enterprise or service provider network in a simplified manner. For example, a server computing system can include a provisioning portal and provisioning engine to communicate and publish configuration information to provisioning agents provided at nodes on the network. For example, a user of an external computing device (e.g., a laptop, desktop computer, tablet, smartphone, etc.) can log into a centralized portal that is able to communicate and publish configuration information (e.g., a traffic profile) to provisioning agents which are provided at nodes on the network. For example, a node may correspond to a server or other computing device. For example, the network may include a 5G core network system.

In some implementations, the user can select particular nodes (e.g., having particular operating systems) which contain traffic of interest to the user (e.g., the nodes are experiencing errors or anomalies). For example, the user can select nodes which are to be configured to duplicate packets that meet certain criteria which are defined according to a traffic profile which is transmitted to the selected nodes. The function of duplicating packets at a node may also be referred to herein as active traffic mirroring or intelligent traffic mirroring.

For example, the user can define a particular traffic profile which contains a list of protocols, ports, and other attributes which are of interest to the user. The provisioning engine may be configured to transmit the traffic profile to nodes provided on the network, and in particular to a provisioning agent of the nodes provided on the network. Each node may further include an intelligent traffic duplicator (which may also be referred to as an intelligent traffic mirror) that determines whether packets received by the node satisfy the criteria set forth in the traffic profile. If a packet received by the node satisfies the criteria set forth in the traffic profile, the intelligent traffic duplicator duplicates the packet and transmits the duplicated packet to a data collector provided as part of the server computing system. For example, the duplicated packet may be transmitted to the data collector via a network tunnel.

For example, the provisioning agent may include a plurality of traffic profiles (e.g., which were configured by the user and transmitted to the provisioning agent via the provisioning engine) with many intelligent traffic duplicators, and many traffic endpoints (i.e., data collectors to which the duplicated packets are to be transmitted to via a corresponding network tunnel). For example, the provisioning engine may be configured to keep track of which traffic profiles are applied to which nodes and which are active or inactive.

The provisioning engine is configured to transmit one or more traffic profiles to a intelligent traffic duplicator of a node. The intelligent traffic duplicator receives the one or more traffic profiles, reads in the filter criteria set forth in the one or more traffic profiles (i.e., traffic filter policies) and applies the one or more traffic profiles to packets which are received by the node to ensure that only packets which satisfy the filter criteria of the one or more traffic policies are duplicated and sent to a corresponding data collector via a corresponding network tunnel.

In some implementations, the intelligent traffic duplicator may exist at the operating system level of a compute node. For example, the compute node can exist within a private cloud, public cloud, or a combination thereof.

In some implementations, the intelligent traffic duplicator may be configured to obtain a data stream from an application hosted by a cloud hosting provider, private hosting provider, or on-premise solutions. The intelligent traffic duplicator is configured to duplicate packets according to a traffic profile and transmit the duplicated packets into a configured network tunnel having a particular destination (e.g., the data collector). For example, each network tunnel may have a different destination (e.g., a particular IP tunnel destination), or some network tunnels may share a same destination (e.g., where each network tunnel transmits packets which have been duplicated according to different traffic profiles). A plurality of nodes may transmit duplicated packets to the same destination (e.g., a data collector) via tunnels from each respective node to the common destination. For example, the plurality of nodes may be configured to apply a same traffic profile to packets each of the nodes receives, and the duplicated packets may be transmitted to the same destination (e.g., a data collector) via tunnels from each respective node to the common destination.

In some implementations, a user of the server computing system can configure the network tunnel to meet the needs of the user and capabilities/restrictions of the network that is being utilized. For example, the network tunnel can be configured to utilize one or more tunnel types, including for example, generic routing encapsulation (GRE), layer two tunneling protocol (L2TP), layer two virtual private network (L2VPN), multiprotocol label switching (MPLS), Internet Protocol Security (IPsec), IP-IP, virtual extensible local area network (VXLAN), etch). For example, the tunnel may support a layer two Ethernet layer.

The data collector (which may be referred to alternatively as a data capture engine) is configured to receive the duplicated packets from the plurality of nodes provided on the network via network tunnels. Duplicated packets which are received by the data collector may be indexed, for example by a data indexing engine. The data indexing engine may index the duplicated packets according to various parameters or metadata associated with the duplicated packets received by the data collector. For example, the indexing engine may index the duplicated packets according to a time or time period (via time stamps), a source IP address, a destination IP address, a payload, a traffic profile, etc.

The server computing system may further include a database which stores a mapping (e.g., via pointers) between the index and the duplicated packets stored at the data collector. For example, if a user wishes to view packet capture information for an IP address associated with a source ID of X for a particular time period, the database can return all duplicated packets having an IP address associated with a source ID of X for the particular time period. For example, if a user wishes to view packet capture information for an IP address associated with a source ID of X in real-time, the database can return all duplicated packets having an IP address associated with a source ID of X in real-time.

In some implementations the portal provided via the server computing system may provide for presentation on a display device associated with the user information about the duplicated packets which are received by the data collector. The portal may also provide for presentation on the display device information about particular duplicated packets (e.g., duplicated packets received during a certain timeframe, duplicated packets received at a particular data collector, duplicated packets originating from a particular source IP, duplicated packets sent from a particular node, etc.). For example, the portal may be configured to allow the user to specify which duplicated packets are of interest to the user, for example, via a graphical user interface.

The server computing system described herein for collecting duplicated packets can be employed in various network architectures. For example, the server computing system can be employed in a 5G core network system.

The server computing system and methods for collecting duplicated packets from a plurality of nodes based on a traffic profile disclosed herein provide a number of technical effects and benefits. For example, the disclosure provides a way for users to easily and automatically collect duplicated packets from a plurality of nodes provided on a network which are associated with traffic of interest to a user, where the duplicated packets are collected at a common destination. A user can specify filter criteria for a traffic profile and specify nodes which are to receive the traffic profile so that a size of a file including duplicated packets received by the data collector and/or information about the duplicated packets, can be controlled. Therefore, the files received from the data collector are not overly large and can be transferred quickly, without causing a burden on the network or computing resources. In addition, the indexing of the duplicated packets enables a user to quickly find information about packets of interest, about traffic occurring at particular nodes, about traffic sent from particular nodes, etc. Therefore, a user need not search through or download duplicated packets received by the data collector which are not relevant to the user.

Reference now will be made to examples of the disclosure, one or more examples of which are illustrated in the drawings, wherein like reference characters denote like elements. Each example is provided by way of explanation of the disclosure and is not intended to limit the disclosure.

FIG. 1 is an example block diagram of an environment suitable for collecting duplicated packets from a plurality of nodes, according to some implementations of the disclosure. In FIG. 1, the environment includes a server computing system 100, a plurality of nodes 300, and an external computing device 400, which are connected to one another over a network 200.

The server computing system 100 can include a server, or a combination of servers (e.g., a web server, application server, etc.) in communication with one another, for example in a distributed fashion.

The plurality of nodes 300 may include nodes provided on a network 200, including first node 300A, second node 300B, third node 300C . . . Nth node 300N. Each of the nodes among the plurality of nodes 300 may have a similar general configuration or may have a different configuration from each other. For example, operating systems of the nodes may be different from one another. The plurality of nodes 300 may correspond to a server node, a compute node, a host computer, and any other computing device suitable for receiving and transmitting packets in a network environment.

The external computing device 400 can include any of a personal or desktop computer, a smartphone, a laptop, a tablet computer, and the like. For example, in some implementations the server computing system 100 includes a traffic capturer 130 which is configured to provide a traffic capture application 131 to the external computing device 400 so that a user of the external computing device 400 can configure the plurality of nodes 300 to duplicate certain packets which are of interest to the user. For example, in some implementations a portal 132A and/or graphical user interface (GUI) 132B may be associated with the traffic capture application 131 such that the user can configure the plurality of nodes 300 via the portal 132A and/or GUI 132B. In some implementations, the server computing system 100 may further provide the portal 132A and/or GUI 132B to the external computing device 400 to enable the user to view information about duplicated packets which are received by a data collector 135.

For example, the network 200 may include any type of communications network such as a local area network (LAN), wireless local area network (WLAN), wide area network (WAN), personal area network (PAN), virtual private network (VPN), or the like. For example, wireless communication between elements of the examples described herein may be performed via a wireless LAN, Wi-Fi, Bluetooth, ZigBee, Wi-Fi direct (WFD), ultra wideband (UWB), infrared data association (IrDA), Bluetooth low energy (BLE), near field communication (NFC), a radio frequency (RF) signal, and the like. For example, wired communication between elements of the examples described herein may be performed via a pair cable, a coaxial cable, an optical fiber cable, an Ethernet cable, and the like. Communication over the network can use a wide variety of communication protocols (e.g., TCP/IP, HTTP, SMTP, FTP), encodings or formats (e.g., HTML, XML), and/or protection schemes (e.g., VPN, secure HTTP, SSL).

The server computing system 100 may include one or more processors 110, one or more memory devices 120, the traffic capturer 130, and a communications interface 140. Each of the features of the server computing system 100 may be operatively connected with one another via a system bus. For example, the system bus may be any of several types of bus structures that may further interconnect to a memory bus (with or without a memory controller), a peripheral bus, and/or a local bus using any of a variety of commercially available bus architectures. In some implementations, features such as the data collector 135 and database 139 may be provided in a distributed fashion among the server computer system 100 and connected through the network 200.

The plurality of nodes 300 may include various features. For the sake of brevity, features of the first node 300A will be described, however features of the first node 300A may also be included in the second node 300B, third node 300C and so on. For example, the first node 300A may include one or more processors 310, one or more memory devices 320, an operating system 330, a provisioning agent 340, an intelligent traffic duplicator 350, and a communications interface 360. Each of the features of the first node 300A may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

The external computing device 400 may include one or more processors 410, one or more memory devices 420, a traffic capture application 430, an input device 440, a display device 450, an output device 460, and a communications interface 470. Each of the features of the external computing device 400 may be operatively connected with one another via a system bus. For example, the system bus may be any of several types of bus structures that may further interconnect to a memory bus (with or without a memory controller), a peripheral bus, and/or a local bus using any of a variety of commercially available bus architectures.

For example, the one or more processors 110, 310, 410 can be any suitable processing device that can be included in a server computing system 100, first node 300A, or external computing device 400. For example, such a processor 110, 310, 410 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 110, 310, 410 can be a single processor or a plurality of processors that are operatively connected, for example in parallel.

The one or more memory devices 120, 320, 420 can include one or more non-transitory computer-readable storage mediums, such as such as a Read Only Memory (ROM), Programmable Read Only Memory (PROM), Erasable Programmable Read Only Memory (EPROM), and flash memory, a USB drive, a volatile memory device such as a Random Access Memory (RAM), an internal or external hard disk drive (HDD), floppy disks, a blue-ray disk, or optical media such as CD ROM discs and DVDs, and combinations thereof. However, examples of the one or more memory devices 120, 320, 420 are not limited to the above description, and the one or more memory devices 120, 320, 420 may be realized by other various devices and structures as would be understood by those skilled in the art.

For example, the one or more memory devices 120 can store instructions, that when executed, cause the one or more processors 110 to receive (e.g., via the traffic capture application 131) an input defining a traffic profile which includes one or more parameters of packets which are to be captured by the plurality of nodes 300 provided on the network 200, as described according to examples of the disclosure. For example, the one or more memory devices 120 can store instructions, that when executed, cause the one or more processors 110 to transmit (e.g., via the traffic capture application 131) the traffic profile to each of the plurality of nodes 300 provided on the network 200, as described according to examples of the disclosure.

For example, the one or more memory devices 320 can store instructions, that when executed, cause the one or more processors 310 to receive the traffic profile from the server computing system 100, as described according to examples of the disclosure. For example, the one or more memory devices 320 can store instructions, that when executed, cause the one or more processors 310 to duplicate packets which are received by the first node 300A which satisfy the traffic profile, as described according to examples of the disclosure. For example, the one or more memory devices

320 can store instructions, that when executed, cause the one or more processors 310 to transmit the duplicated packets to data collector 135, as described according to examples of the disclosure.

For example, the one or more memory devices 420 can store instructions, that when executed, cause the one or more processors 410 to receive (e.g., via the traffic capture application 430 and input device 440) an input defining the traffic profile which includes one or more parameters of packets which are to be captured by the plurality of nodes 300 provided on the network 200, as described according to examples of the disclosure. For example, the one or more memory devices 120 can store instructions, that when executed, cause the one or more processors 110 to transmit (e.g., via the traffic capture application 430) the traffic profile to the server computing system 100 and/or to the plurality of nodes 300, as described according to examples of the disclosure.

The one or more memory devices 120 can also include data 122 and instructions 124 that can be retrieved, manipulated, created, or stored by the one or more processors 110. In some examples, such data can be accessed and used as input to receive (e.g., via the traffic capture application 131) an input defining a traffic profile which includes one or more parameters of packets which are to be captured by the plurality of nodes 300 provided on the network 200 and to transmit (e.g., via the traffic capture application 131) the traffic profile to each of the plurality of nodes 300 provided on the network 200, as described according to examples of the disclosure.

The one or more memory devices 320 can also include data 322 and instructions 324 that can be retrieved, manipulated, created, or stored by the one or more processors 310. In some examples, such data can be accessed and used as input to duplicate packets which are received by the first node 300A which satisfy the traffic profile, as described according to examples of the disclosure and to transmit the duplicated packets to data collector 135, as described according to examples of the disclosure.

The one or more memory devices 420 can also include data 422 and instructions 424 that can be retrieved, manipulated, created, or stored by the one or more processors 410. In some examples, such data can be accessed and used as input to receive (e.g., via the traffic capture application 430 and input device 440) an input defining the traffic profile which includes one or more parameters of packets which are to be captured by the plurality of nodes 300 provided on the network 200 and to transmit (e.g., via the traffic capture application 430) the traffic profile to the server computing system 100 and/or to the plurality of nodes 300, as described according to examples of the disclosure.

The traffic capturer 130 can include any system suitable for configuring nodes provided on a network to capture and duplicate packets which satisfy a traffic profile and for collecting the duplicated packets. As shown in FIG. 1, the traffic capturer 130 can include the traffic capture application 131, the portal 132A and/or GUI 132B, a provisioning engine 133, the data collector 135, a data index engine 137, and a database 139.

The traffic capture application 131 can include any application which allows or is capable of allowing a user to define a traffic profile, to configure nodes provided on the network 200 to capture and duplicate packets which satisfy the traffic profile, to define a destination such as the data collector 135 for collecting the duplicated packets, to obtain information about the duplicated packets which are collected at the destination (e.g., by generating a report, by viewing or monitoring results of the data collection concerning the duplicated packets received at the destination, etc.). The user may use such information to troubleshoot errors or anomalies occurring on the network and may take appropriate action via the server computing system 100 by evaluating the results of the information obtained from collecting the duplicated packets (e.g., by taking security measures when detecting an intrusion to the network, by shifting network resources when network congestion is detected at a particular node, etc.).

The traffic capturer 130 may include a portal 132A and/or GUI 132B which is used in connection with the traffic capture application 131. For example, a user of the external computing device 400 may log in to the server computing system 100 through the portal 132A to access the traffic capture application 131. For example, the user of the external computing device 400 may execute the traffic capture application 430 to access the portal 132A provided by the server computing system 100. In some implementations, the portal 132A may provide for presentation on the display device 450 of the external computing device 400 the GUI 132B by which the user of the external computing device 400 can implement various functions of the traffic capture application 131 to be described in more detail later.

The server computing system 100 may include a provisioning engine 133 which is configured to transmit information from the server computing system 100 to the plurality of nodes 300 provided on the network 200. For example, the provisioning engine 133 may be configured to transmit one or more traffic profiles generated via the portal 132A and/or GUI 132B to the plurality of nodes 300. For example, the provisioning engine 133 may be configured to keep track of which traffic profiles are applied to which nodes and which traffic profiles are active or inactive.

The server computing system 100 may include a data collector 135 which is configured to receive duplicated packets from the plurality of nodes 300 provided on the network 200. The duplicated packets correspond to packets which have been duplicated from packets which are captured by the plurality of nodes 300 and satisfy the traffic profile. In some implementations, the data collector 135 may correspond to the one or more memory devices 120, however the data collector 135 is shown separately in FIG. 1 to describe the features of the data collector 135 in connection with the traffic capturer 130.

The server computing system 100 may include a data indexing engine 137. Duplicated packets which are received by the data collector 135 may be indexed, for example by the data indexing engine 137. The data indexing engine 137 may be configured to index the duplicated packets according to various parameters or metadata associated with the duplicated packets received by the data collector 135. For example, the data indexing engine 137 may be configured to index the duplicated packets according to a time or time period (via time stamps associated with the duplicated packets), a source IP address, a destination IP address, a payload, a traffic profile, etc.

The server computing system 100 may include a database 139. The database may be configured to store a mapping (e.g., via pointers) between the index generated by the data indexing engine 137 and the duplicated packets stored at the data collector 135. For example, if a user wishes to view packet capture information for an IP address associated with a source ID of X for a particular time period, the database 139 can return all duplicated packets having the IP address associated with the source ID of X for the particular time period. For example, if a user wishes to view packet capture information for an IP address associated with a source ID of X in real-time, the database 139 can return all duplicated packets having the IP address associated with the source ID of X in real-time. In some implementations, the database 139 may correspond to the one or more memory devices 120, however the database 139 is shown separately in FIG. 1 to describe the features of the database 139 in connection with the traffic capturer 130.

Each of the server computing system 100, first node 300A, and external computing device 400 may include a communications interface. For example, communications interfaces 140, 360, 470 may include any communications interfaces suitable for communicating via the network 200 as appropriate or desired. For example, the communications interfaces 140, 360, 470 may include a network interface card.

Referring back to the first node 300A, further features of the operating system 330, provisioning agent 340, and intelligent traffic duplicator 350 will now be described. The operating system 330 of the first node 300A may include, for example, any operating system of a computing device which may be used to manage the memory and processes of the computing device, application programs provided on the computing device, etc. Example operating systems include WINDOWS, UNIX, LINUX, and the like.

The first node 300A may include a provisioning agent 340 which is configured to receive information from the server computing system 100. For example, the provisioning agent 340 may be configured to receive one or more traffic profiles from the provisioning engine 133.

The first node 300A may include an intelligent traffic duplicator 350 (which may also be referred to as an intelligent traffic mirror) that determines whether packets received by the first node 300A satisfy the criteria set forth in the traffic profile received by the provisioning agent 340. If a packet received by the first node 300A satisfies the criteria set forth in the traffic profile, the intelligent traffic duplicator 350 is configured to duplicate the packet and cause the duplicated packet to be transmitted to the data collector 135. For example, the duplicated packet may be transmitted to the data collector 135 via a network tunnel 3200.

Referring back to the external computing device 400, further features of the traffic capture application 430, input device 440, display device 450, and output device 460 will now be described.

The external computing device 400 includes a traffic capture application 430. The traffic capture application 430 can include any application which allows or is capable of allowing a user to define a traffic profile, to configure nodes provided on a network to capture and duplicate packets which satisfy the traffic profile, to define a destination such as a data collector for collecting the duplicated packets, to obtain information about the duplicated packets which are collected at the destination (e.g., by generating a report, by viewing or monitoring results of the data collection concerning the duplicated packets received at the destination, etc.). The user may use such information to troubleshoot errors or anomalies occurring on the network and may take appropriate action via the external computing device 400 by evaluating the results of the information obtained from collecting the duplicated packets (e.g., by taking security measures when detecting an intrusion to the network, by shifting network resources when network congestion is detected at a particular node, etc.). In some implementations, the traffic capture application 430 is associated with traffic capture application 131. For example, the traffic capture application 430 can be executed at the external computing device 400 to access portal 132A and GUI 132B which provides the functionality of the traffic capture application 131 to allow the user to define the traffic profile, to configure nodes provided on the network to capture and duplicate packets which satisfy the traffic profile, to define the destination such as the data collector 135 for collecting the duplicated packets, to obtain information about the duplicated packets which are collected at the destination, etc.

The external computing device 400 includes an input device 440 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a portable (e.g., a cellular or smart) phone, and so on. The input device 440 may be integrated with the external computing device 400 or may be communicatively coupled to the external computing device 400. For example, a user may hold a remote controller having buttons, switches, a keyboard, etc., to provide an input for executing a function of the external computing device 400, where the input may be transmitted from the remote controller to the external computing device 400 in a wired or wireless manner. The input device 440 may also be embodied by a touch-sensitive display device having a touchscreen capability, for example. The input device 440 may be used by a user of the external computing device 400 to provide an input to execute the traffic capture application 430 and to interact with the GUI 132B provided via the portal 132A (e.g., to set or generate a traffic profile, to select nodes to which the traffic profile should be transmitted, to set times at which the traffic capture should occur, to select a destination to which the duplicated packets should be sent, to review results of the traffic capture, etc.). For example, the input may be a voice input, a touch input, a gesture input, a click via a mouse or remote controller, and so on.

The external computing device 400 includes a display device 450 which presents information viewable by the user, for example on a user interface (e.g., the GUI 132B provided via the portal 132A). For example, the display device 450 may be a non-touch sensitive display. The display device 450 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example display devices and may include other types of display devices.

The external computing device 400 includes an output device 460 configured to provide an output to the user and may include, for example, one or more of an audio device (e.g., one or more speakers), a haptic device to provide haptic feedback to a user, a light source (e.g., one or more light sources such as LEDs which provide visual feedback to a user), and the like. For example, in some implementations, the user may be guided through a process for capturing packets on the network 200 using the traffic capture application 430. The output device 460 may provide various indications to inform, alert, or notify the user of anomalies or errors which are detected on the network as a result of an evaluation of the duplicated packets received at the data collector 135. For example, in some implementations, the user may be notified or alerted to perform a certain action for responding to a detected anomaly or error via a combination of one or more a speaker, haptic device, and light source.

Referring to FIG. 2, in an example computer implemented method 2000 at operation 2010 the method includes receiving an input defining a first traffic profile which includes one or more parameters of packets which are to be captured by a first plurality of nodes provided on a network. For example, the server computing system 100 may receive via the portal 132A and/or GUI 132B an input (e.g., via the traffic capture application 131) that is used to define a traffic profile that includes one or more parameters (e.g., filter criteria) of packets which are to be captured by a plurality of nodes (e.g., the plurality of nodes 300 or a subset of the plurality of nodes 300). In another implementation, the external computing device 400 may receive, via the input device 440, an input that is used to define the traffic profile. The input may be a selection of a user interface element that is presented on the GUI 132B that is provided via the portal 132A for presentation on the display device 450.

At operation 2020 the method includes transmitting the first traffic profile to each of the first plurality of nodes provided on the network. For example, the server computing system 100 may transmit (e.g., via the provisioning engine 133) the traffic profile to a plurality of nodes (e.g., the plurality of nodes 300 or a subset of the plurality of nodes 300). For example, the traffic profile may be transmitted to nodes which are selected by a user of the external computing device 400 via the traffic capture application 131, 430. In another implementation, the external computing device 400 may directly transmit the traffic profile to the plurality of nodes (e.g., the plurality of nodes 300 or a subset of the plurality of nodes 300) after the user defines the traffic profile and selects nodes which are to receive the traffic profile.

At operation 2030 the method includes receiving, at a data collector, duplicated packets from the first plurality of nodes, the duplicated packets corresponding to packets which have been duplicated from packets which are captured by the first plurality of nodes and satisfy the first traffic profile. For example, the server computing system 100 may identify the data collector 135 as a destination which is to receive the duplicated packets from the plurality of nodes. The data collector 135 may correspond to the one or more memory devices 120. The plurality of nodes which receive the traffic profile duplicate packets which satisfy the traffic profile and transmit the duplicated packets to the data collector 135, for example, via a network tunnel. In another implementation, the external computing device 400 may identify the data collector 135 as a destination which is to receive the duplicated packets from the plurality of nodes (e.g., via the traffic capture application 430). In some implementations, the data collector 135 may correspond to the one or more memory devices 420. The plurality of nodes which receive the traffic profile duplicate packets which satisfy the traffic profile and transmit the duplicated packets to the data collector 135, for example, via a network tunnel.

Figure 3:
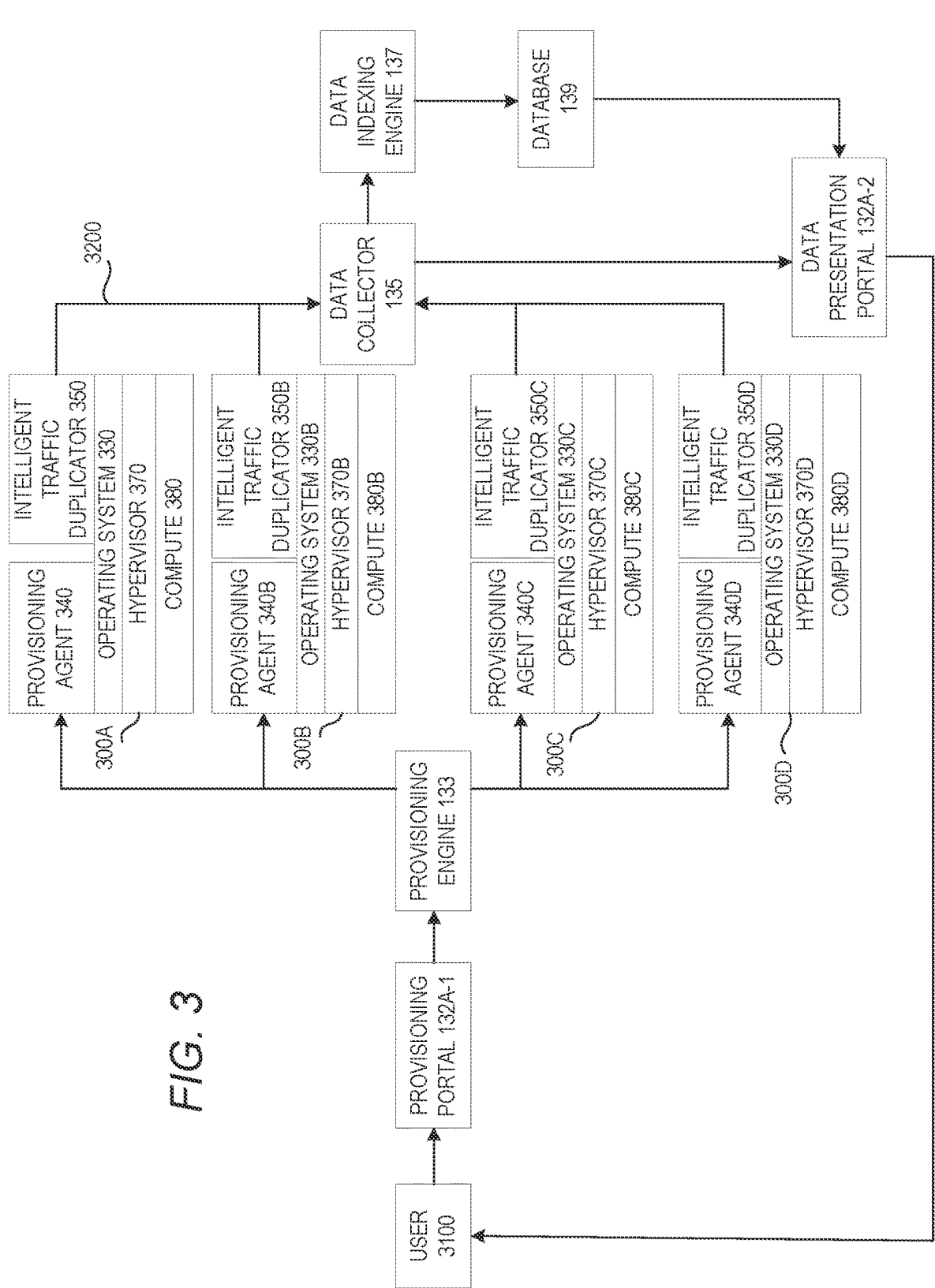
FIG. 3 is an example block diagram of an environment suitable for collecting duplicated packets from a plurality of nodes, according to some implementations of the disclosure.

Referring to FIG. 3, an example block diagram of an environment suitable for collecting duplicated packets from a plurality of nodes, according to some implementations of the disclosure, is shown. In FIG. 3 a user 3100 may access a provisioning portal 132A-1 (which may be part of the server computing system 100 and a subpart of portal 132 described previously) to provide an input defining one or more traffic profiles, to provide an input defining which nodes are to receive the one or more traffic profiles (e.g., an input indicating a traffic profile is to be transmitted to first node 300A, second node 300B, third node 300C, and fourth node 300D), and to provide an input defining a destination to which duplicated packets which satisfy a traffic profile are to be sent (e.g., data collector 135). The user 3010 may also provide an input defining a time or a time period at which the nodes are to receive the one or more traffic profiles and a time or time period at which the nodes are to activate the one or more traffic profiles. The user 3010 may provide the inputs described above via the input device 440 of the external computing device 400 via the traffic capture application 430 in association with the traffic capture application 131 which is provided via the provisioning portal 132A-1 and GUI 132B (e.g., in the form of a web page) which can be presented for display on the display device 450.

The provisioning portal 132A-1 may transmit the one or more traffic profiles and other corresponding information (e.g., nodes to receive particular traffic profile(s), time information associated with transmitting the one or more traffic profiles, time information for activating the one more traffic profiles, destination information, etc.) to the provisioning engine 133 (e.g., through an application programming interface). The provisioning engine 133 may be configured to transmit the one or more traffic profiles and the other corresponding information in accordance with the nodes designated via the provisioning portal 132A-1. For example, the provisioning engine 133 may be configured to transmit one or more traffic profiles to first node 300A, second node 300B, third node 300C, and fourth node 300D. For example, the provisioning engine 133 may be configured to keep track of which traffic profiles are applied to which nodes and which traffic profiles are active or inactive.

As shown in FIG. 3, first node 300A includes the operating system 330, the provisioning agent 340, the intelligent traffic duplicator 350, a hypervisor 370, and a compute node 380. For example, first node 300A may be a host server that is associated with providing virtualization services to create virtual machines via the hypervisor 370, operating system 330, and compute node 380. Nodes 300B, 300C, 300D similarly include an operating system 330B, 330C, 330D, a provisioning agent 340B, 340C, 340D, an intelligent traffic duplicator 360B, 360C, 360D, a hypervisor 370B, 370C, 370D, and a compute node 380B, 380C, 380D, and a discussion of those features will not be repeated for the sake of brevity. The provisioning agent 340 is configured to receive information from the server computing system 100, for example, via an application programming interface. For example, the provisioning agent 340 may be configured to receive one or more traffic profiles from the provisioning engine 133, time information associated with receiving the one or more traffic profiles, time information for activating the one more traffic profiles (i.e., a time for duplicating packets which are satisfy a traffic profile), destination information for sending the duplicated packets, etc.

The intelligent traffic duplicator 350 (which may also be referred to as an intelligent traffic mirror) determines whether packets received by the first node 300A satisfy parameters (e.g., filter criteria) set forth in the traffic profile received by the provisioning agent 340. If a packet received by the first node 300A satisfies the parameters set forth in the traffic profile, the intelligent traffic duplicator 350 is configured to duplicate the packet and cause the duplicated packet to be transmitted to a designated destination (e.g., the data collector 135). For example, the duplicated packet may be transmitted to the data collector 135 via a network tunnel 3200.

For example, the network tunnel 3200 can be configured to utilize one or more tunnel types, including for example, generic routing encapsulation (GRE), layer two tunneling protocol (L2TP), layer two virtual private network (L2VPN), multiprotocol label switching (MPLS), Internet Protocol Security (IPsec), IP-IP, virtual extensible local area network (VXLAN), etc). For example, the network tunnel 3200 may support a layer two Ethernet layer.

The data collector 135 is configured to receive the duplicated packets from a plurality of nodes (e.g., first node 300A, second node 300B, third node 300C, fourth node 300D) provided on the network. The duplicated packets correspond to packets which have been duplicated from packets which are captured by the plurality of nodes and satisfy the traffic profile. For example, the data collector 135 may correspond to the one or more memory devices 120 or the one or more memory devices 420.

The data indexing engine 137 is configured to index the duplicated packets received by the data collector 135. The data indexing engine 137 may receive a data stream from the data collector 135 concerning information about the duplicated packets and may be configured to index the duplicated packets according to various parameters or metadata associated with the duplicated packets. For example, the data indexing engine 137 may be configured to index the duplicated packets according to a time or time period (via time stamps associated with the duplicated packets), a source IP address, a destination IP address, a payload, a traffic profile, etc.

The database 139 may be communicatively coupled to the data indexing engine 137 and be configured to store a mapping (e.g., via pointers) between the index generated by the data indexing engine 137 and the duplicated packets stored at the data collector 135.

In FIG. 3 a user 3100 may access a data presentation portal 132A-2 (which may be part of the server computing system 100 and a subpart of portal 132 described previously) to provide an input requesting information about the duplicated packets received by the data collector 135. The user 3010 may provide the inputs via the input device 440 of the external computing device 400 via the traffic capture application 430 in association with the traffic capture application 131 which is provided via the data presentation portal 132A-2 and GUI 132B (e.g., in the form of a web page) which can be presented for display on the display device 450. Results associated with the duplicated packets received by the data collector 135 can be presented on the display device 450 (e.g., via a web page), and a traffic analysis report can be generated. The data presentation portal 132A-2 can be configured to present the user with options for responding to the information presented. For example, the data presentation portal 132A-2 may provide options for troubleshooting errors or anomalies occurring on the network (e.g., options for taking security measures when detecting an intrusion to the network, options for shifting network resources when network congestion is detected at a particular node, etc.).

For example, if a user inputs a request to view packet capture information for an IP address associated with a source ID of X for a particular time period, the database 139 can return all duplicated packets having the IP address associated with the source ID of X for the particular time period. The external computing device 400 can download (e.g., via a HTTP file download) the duplicated packets having the IP address associated with the source ID of X for the particular time period from the data collector 135. Therefore, the user can focus an inquiry based on particular conditions and exercise a degree of control over a size of a file to be downloaded from the data collector 135, rather than having to sift through all duplicated packets or download all of the duplicated packets stored at the data collector 135. For example, if a user inputs a request to view packet capture information for an IP address associated with a source ID of X in real-time, the database 139 can return all duplicated packets having the IP address associated with the source ID of X in real-time. The external computing device 400 can download (e.g., via a HTTP file download) the duplicated packets having the IP address associated with the source ID of X from the data collector 135. In some implementations, the database 139 may correspond to the one or more memory devices 120 or the one or more memory devices 420.

FIGS. 4A-4E are example illustrations of a graphical user interface for collecting duplicated packets from a plurality of nodes, according to some implementations of the disclosure. For example, the graphical user interfaces (GUIs) shown in FIGS. 4A-4E may be presented for display on the display device 450 of the external computing device 400.

Figure 4A:
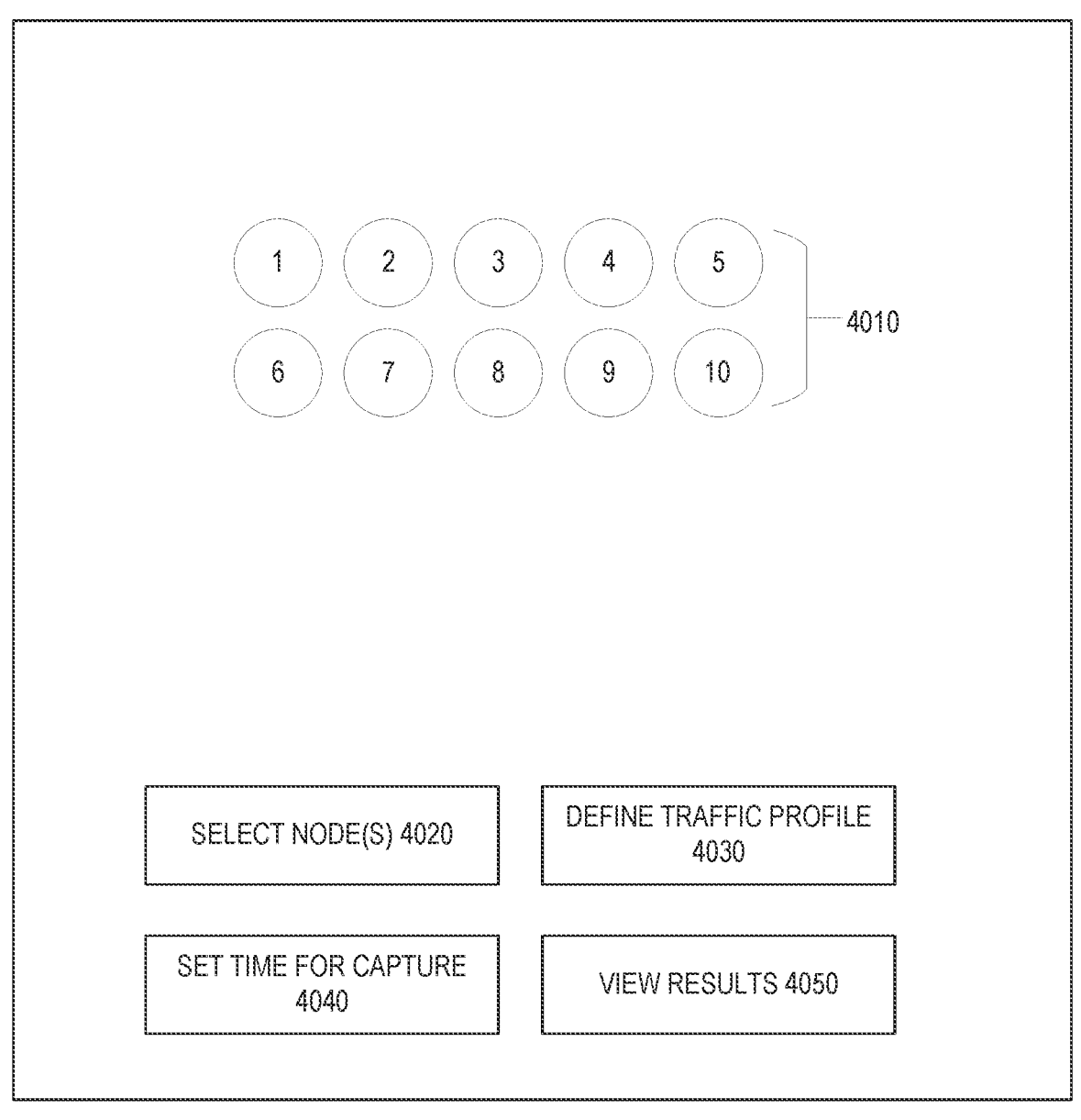
FIGS. 4A-4E are example illustrations of a graphical user interface for collecting duplicated packets from a plurality of nodes, according to some implementations of the disclosure.

FIG. 4A illustrates an example GUI which includes a plurality of nodes 4010 of a network and a plurality of user interface elements. The plurality of user interface elements include a first user interface element 4020 by which a user can select one or more nodes, a second user interface element 4030 by which a user can define a traffic profile to be applied to one or more nodes, a third user interface element 4040 by which a user can set a time for one or more nodes to capture and duplicate packets according to a traffic profile, and a fourth user interface element 4050 by which a user can view results concerning duplicated packets which are received by the data collector 135.

Figure 4B:
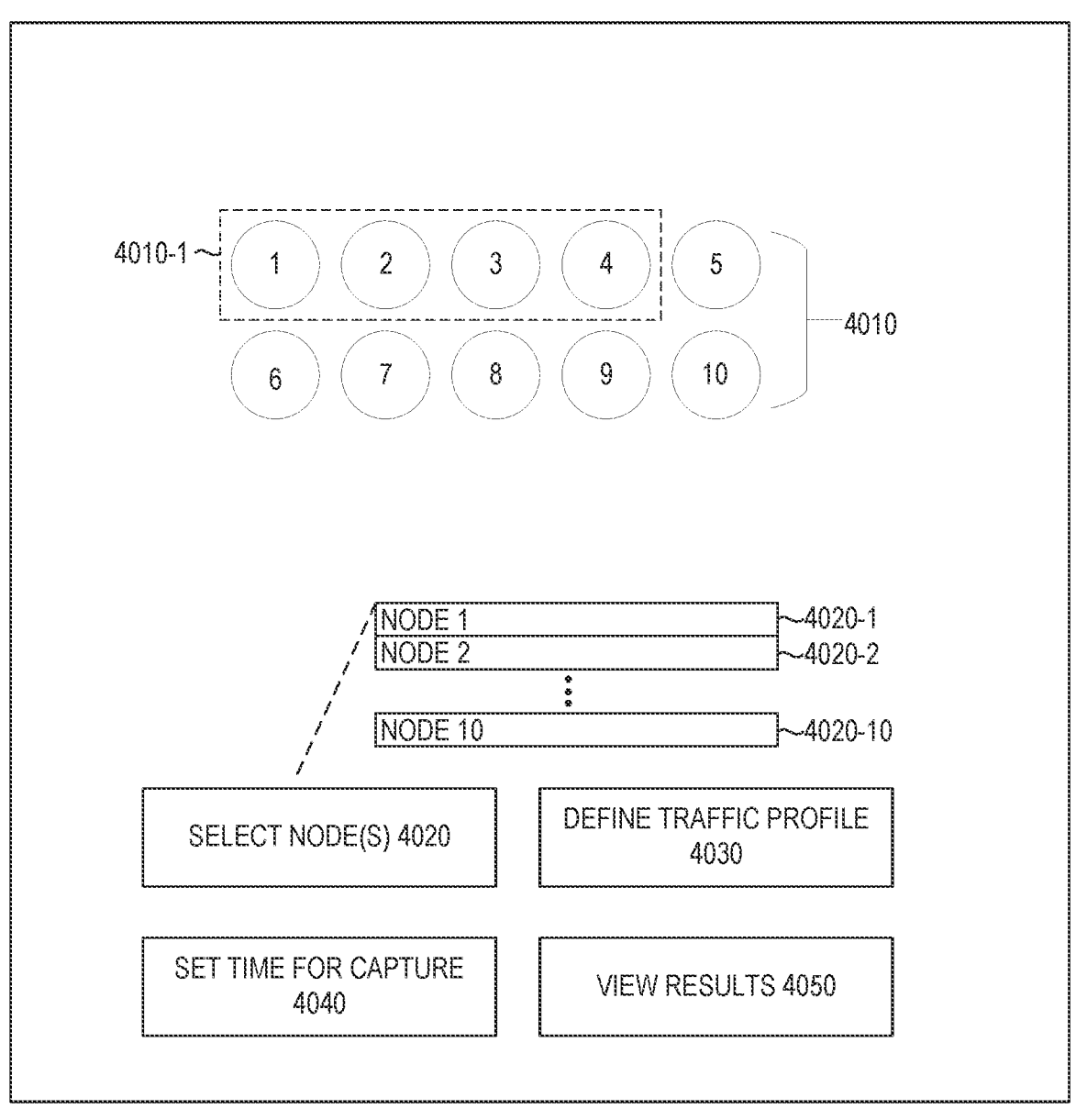

FIG. 4B illustrates an example GUI which may be presented for display on the display device 450 in response to a user providing an input selecting first user interface element 4020. For example, in response to a user providing an input selecting first user interface element 4020, a pop-up window or pull-down menu may be displayed by which a user can select one or more nodes (e.g., node 1 4020-1, node 2 4020-2 . . . node 10 4020-10) among the plurality of nodes 4010. As illustrated in FIG. 4B, the user has provided an input selecting a first group of nodes 4010-1 which includes nodes one through four.

Figure 4C:
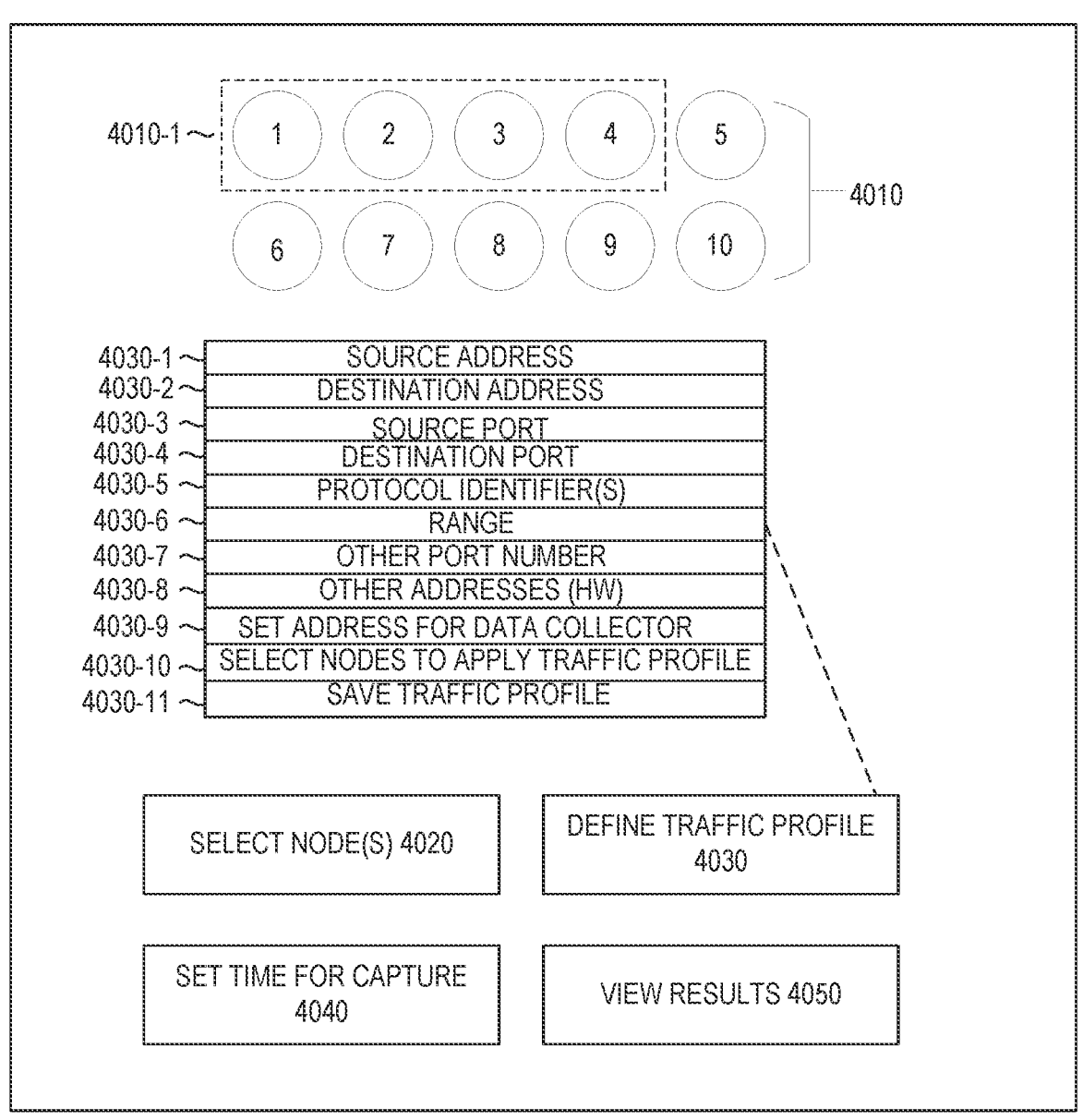

FIG. 4C illustrates an example GUI which may be presented for display on the display device 450 in response to a user providing an input selecting second user interface element 4030. For example, in response to a user providing an input selecting second user interface element 4030, a pop-up window or pull-down menu may be displayed by which a user can select one or more parameters (e.g., filter criteria) for defining a traffic profile. For example, the one or more parameters (e.g., filter criteria) may include: a source address 4030-1; a destination address 4030-2, a source port 4030-3, a destination port 4030-4, protocol identifier(s) 4030-5 (e.g., a code which identifies the protocol, such as a code representing a transport layer protocol including a transmission control protocol, a user datagram protocol, file transfer protocol, simple mail transfer protocol, etc.); a range 4030-6 (e.g., of addresses); an OTHER PORT NUMBER 4030-7 regarding port numbers other than those associated with a source or destination; and other addresses (HW) 4030-8 which may include address information of hardware (e.g., regarding media access control addresses). For example, the one or more parameters (e.g., filter criteria) may include filtering by a type of packet traffic. For example, a first traffic profile may be associated with packets relating to user plane traffic while a second traffic profile may be associated with packets relating to control plane traffic.

Additional options which may be presented for selection may include: setting an address which identifies a destination address to which duplicated packets are to be transmitted by a node which applies the traffic profile (SET ADDRESS FOR DATA COLLECTOR 4030-9); selecting nodes which are to receive and apply the traffic profile (SELECT NODES TO APPLY TRAFFIC PROFILE 4030-10); and saving a traffic profile (SAVE TRAFFIC PROFILE 4030-11). Each node may receive one or more traffic profiles. The server computing system 100 may store various traffic profiles in the one or more memory devices 120 and/or the external computing device 400 may locally store various traffic profiles in the one or more memory devices 420.

Figure 4D:
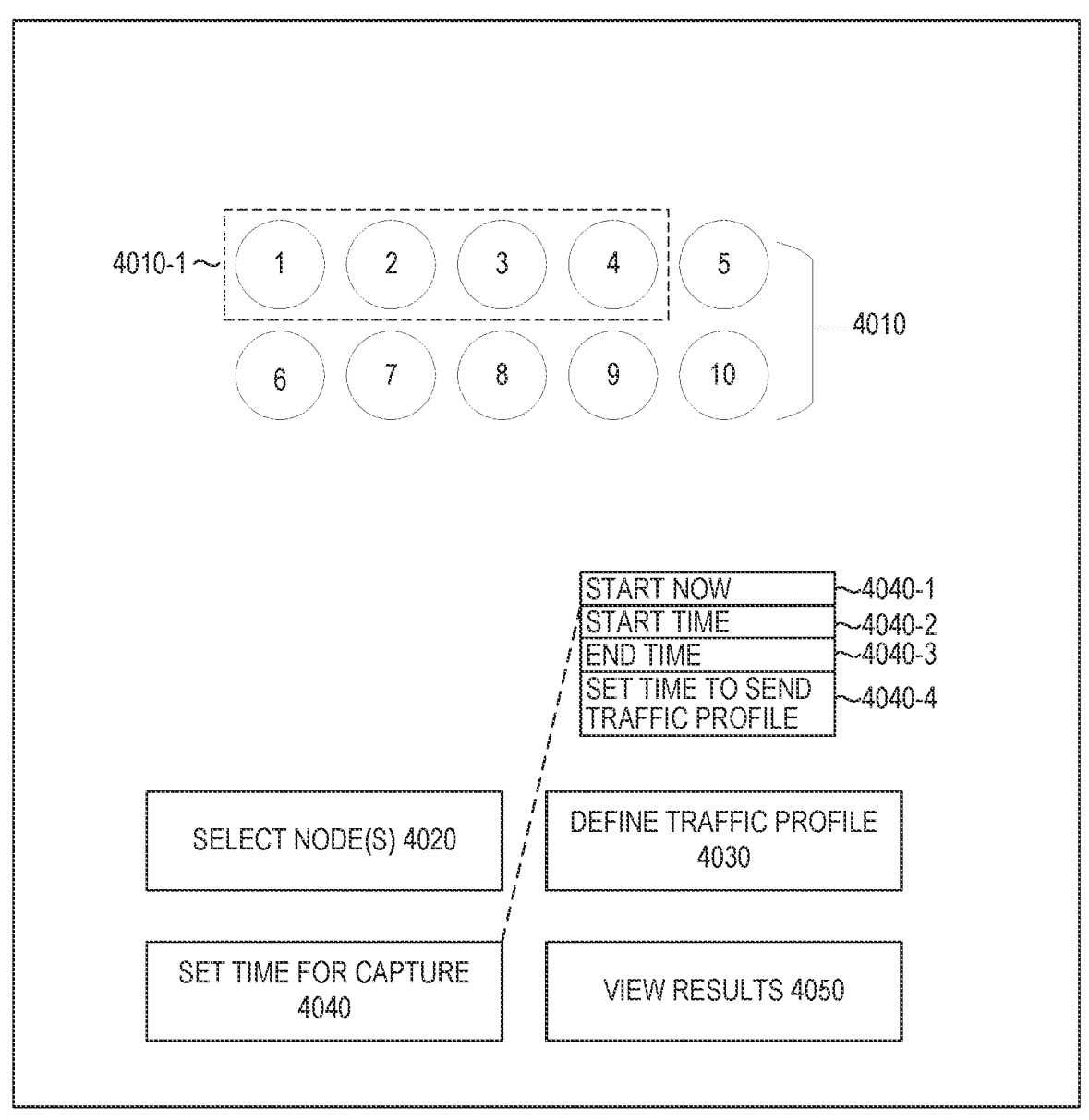

FIG. 4D illustrates an example GUI which may be presented for display on the display device 450 in response to a user providing an input selecting third user interface element 4040. For example, in response to a user providing an input selecting third user interface element 4040, a pop-up window or pull-down menu may be displayed by which a user can select one or more options associated with nodes capturing and duplicating packets according to a traffic profile received from the server computing system 100 or external computing device 400. For example, the one or more options may include: a user interface element START NOW 4040-1 which initiates the activation of applying a traffic profile immediately at one or more nodes upon selection; a time (e.g., future time) for a node or group of nodes to begin applying (activate) the traffic profile (START TIME 4040-2) so that the application of the traffic profile by one or more nodes and the collection of the duplicated packets by the data collector 135 can be automatically performed; a time for a node or group of nodes to end applying (deactivate) the traffic profile (e.g., via user interface element labeled END TIME 4040-3); and a time at which a traffic profile is to be sent to one or more nodes (SET TIME TO SEND TRAFFIC PROFILE 4040-4). For example, the traffic profile can be sent to one or more nodes at a same time (or substantially same time) as the time at which the nodes are to apply (activate) the traffic profile and begin the capture and duplication operations. Therefore, the nodes need not consume computing resources by storing the traffic profile for a time longer than needed, and network usage may be conserved by not sending the traffic profile until such time as it is needed. In some implementations however, the user may provide an input which transmits the traffic profile to one or more nodes at a time different from a start time for applying the traffic profile. For example, the server computing system 100 or external computing device 400 may transmit a destination IP address associated with the data collector 135 to the nodes at a same time as the traffic profile is transmitted to the nodes. For example, the server computing system 100 or external computing device 400 may transmit information to the nodes at the end time (selected via the user interface element labeled END TIME 4040-3) instructing each of the plurality of nodes to stop duplicating packets based on the traffic profile, or alternatively such information may be transmitted together with the traffic profile.

Figure 4E:
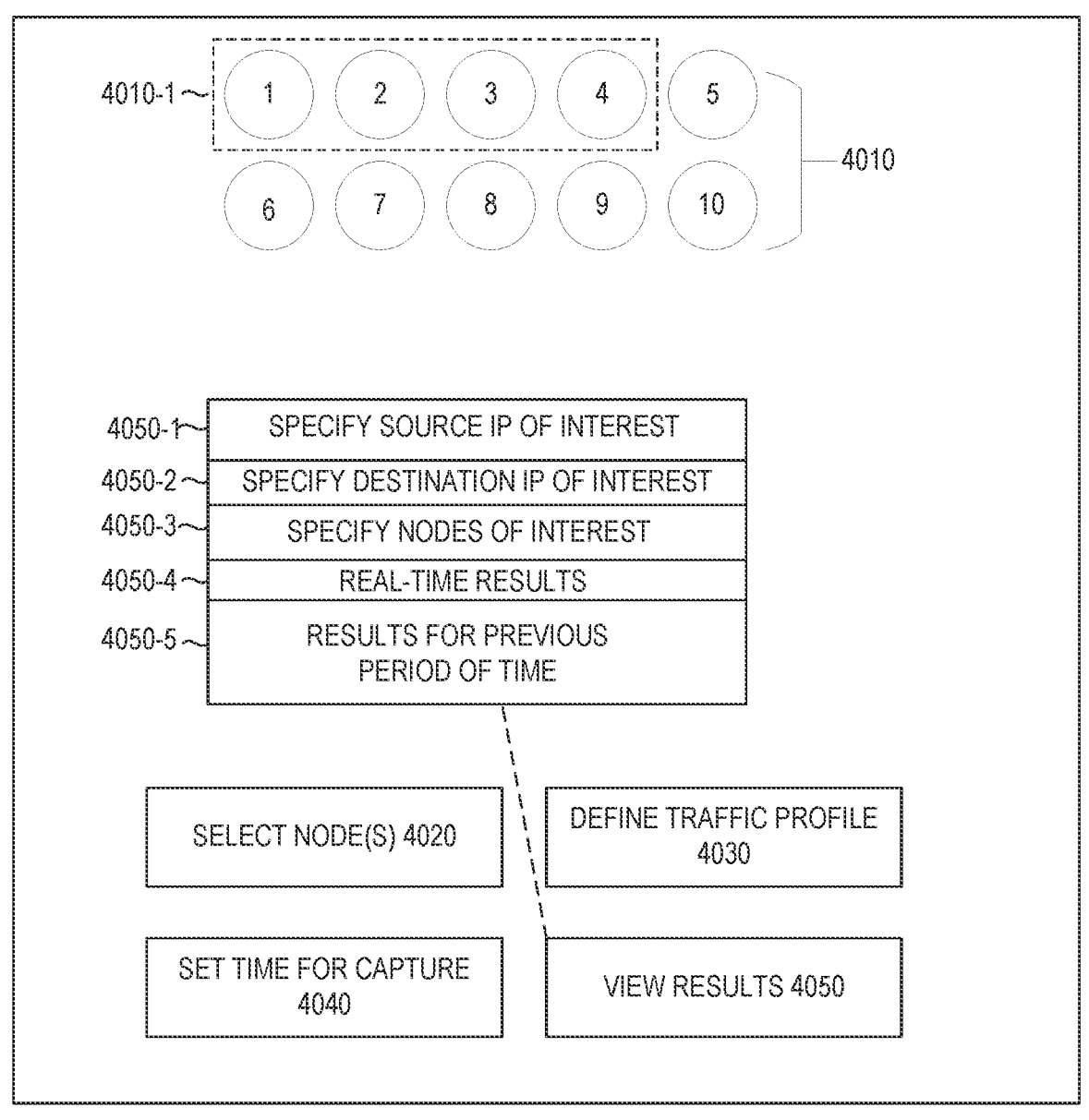

FIG. 4E illustrates an example GUI which may be presented for display on the display device 450 in response to a user providing an input selecting fourth user interface element 4050. For example, in response to a user providing an input selecting fourth user interface element 4050, a pop-up window or pull-down menu may be displayed by which a user can select one or more options associated with viewing results associated with duplicated packets that are received by the data collector 135. For example, the one or more options may include a first option by which a user can specify a source IP of interest to view results associated with duplicated packets that originate from a particular IP address (SPECIFY SOURCE IP OF INTEREST 4050-1). For example, the one or more options may include a second option by which a user can specify a destination IP of interest to view results associated with duplicated packets that are to be transmitted to a particular IP address (SPECIFY DESTINATION IP OF INTEREST 4050-2). For example, the one or more options may include a THIRD option by which a user can specify nodes of interest to view results associated with duplicated packets that are transmitted from particular nodes (SPECIFY NODES OF INTEREST 4050-3). The above-described examples are non-limiting and other options may be available to view results of interest to the user, such as specifying a range of source IP addresses, or a range of destination IP addresses, etc. In some implementations, the user may provide an input requesting real-time results associated with duplicated packets which are received by the data collector 135 in real-time (e.g., via user interface element REAL-TIME RESULTS 4050-4). In some implementations, the user may provide an input requesting results associated with duplicated packets which were received by the data collector 135 during a particular time-period (e.g., via user interface element RESULTS FOR PREVIOUS PERIOD OF TIME 4050-5).

FIG. 5 is an example illustration of configurations of traffic profiles suitable for collecting duplicated packets from a plurality of nodes, according to some implementations of the disclosure. As discussed above, a user may provide an input defining various traffic profiles which can be applied by one or more nodes of a network, and that some nodes may store or apply more than one traffic profile at a time. The traffic profiles can be applied (activated) automatically based on the inputs provided by the user in advance. For example, the traffic profiles may be stored in the one or more memory devices 120 and/or one or more memory devices 420.

Referring to FIG. 5, a table 5000 illustrates in a non-limiting example three different configurations with respect to three traffic profiles (traffic profiles A, B, and C). For example, in a first configuration 5010, CONFIG X specifies that nodes one through three are to receive traffic profile A and are to apply the traffic profile at start time G through end time H. Duplicated packets are to be sent to destination D (e.g., to a data collector via a network tunnel). Other information may also be included in the configuration such as a time for sending the traffic profile A to nodes one through three. For example, in a second configuration 5020, CONFIG Y specifies that nodes four through six are to receive traffic profile B and are to apply the traffic profile at start time J through end time K. Duplicated packets are to be sent to destination E (e.g., to a data collector via a network tunnel). Other information may also be included in the configuration such as a time for sending the traffic profile B to nodes one through three. For example, in a third configuration 5030, CONFIG Z specifies that nodes one through three are to receive traffic profile C and are to apply the traffic profile at start time L through end time M. Duplicated packets are to be sent to destination F (e.g., to a data collector via a network tunnel). Other information may also be included in the configuration such as a time for sending the traffic profile C to nodes one through three. As shown by table 5000, in the example of FIG. 5 nodes one through three may receive more than one traffic profile. For example, traffic profiles A and C may be applied (activated) by nodes one through three at a same time or an overlapping time. Therefore, duplicated packets may be received by a data collector associated with destination D at a same time, or at an overlapping time, with duplicated packets which are received by another data collector which is associated with destination F. In some implementations, duplicated packets associated with different traffic profiles may be received by a same data collector (e.g., CONFIG Z may have destination D instead of destination F.

All or a portion of the examples described herein may be implemented as a computer program product stored on a transitory or non-transitory computer-usable or computer-readable storage medium, such as the memory devices 120, 320, 420, which includes complex programming instructions, such as complex computer-readable program code, to cause the one or more processors 110, 310, 410 to carry out the operations described herein. Thus, the computer-readable program code can include software instructions for implementing the functionality of the examples described herein when executed on the one or more processors 110, 310, 410.

The computer-readable media (e.g., non-transitory computer-readable media) may include, alone or in combination with the programming instructions, data files, data structures, and the like. Examples of non-transitory computer-readable media include magnetic media such as hard disks, floppy disks, and magnetic tape; optical media such as CD ROM disks, Blue-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of programming instructions include both machine code, such as produced by a compiler, and files containing higher level code that may be executed by the computer using an interpreter. The programming instructions may be executed by one or more processors (e.g., one or more processors 110 and/or one or more processors 310). The described hardware devices may be configured to act as one or more software modules in order to perform the operations of the above-described examples, or vice versa. In addition, a non-transitory computer-readable storage medium may be distributed among computer systems connected through a network and computer-readable codes or programming instructions may be stored and executed in a decentralized manner. In addition, the non-transitory computer-readable storage media may also be embodied in at least one application specific integrated circuit (ASIC) or Field Programmable Gate Array (FPGA).

While the disclosure has been described with respect to various examples, each example is provided by way of explanation, not limitation of the disclosure. For example, features illustrated or described as part of one example can be used with another example to yield a still further example. Thus, it is intended that the disclosure covers such alterations, variations, and equivalents. Individuals will recognize improvements and modifications to the examples described in this disclosure. All such improvements and modifications are considered within the scope of the concepts disclosed herein and the claims that follow.

What is claimed is:

1. A method, comprising:

providing a user interface, for presentation on a display of a computing device, to display a first plurality of user interface elements representing a first plurality of nodes provided on a network and a second plurality of user interface elements for defining a first traffic profile which includes one or more parameters of packets which are to be captured by the first plurality of nodes provided on the network;

receiving, via one or more first inputs to the user interface, a selection of the first plurality of user interface elements representing the first plurality of nodes as nodes from the network which are to receive the first traffic profile;

receiving, via one or more second inputs to the user interface, a selection of the second plurality of user interface elements to define the first traffic profile;

receiving, via one or more third inputs to the user interface, transmit information defining a time or a time period at which the first plurality of nodes are to receive the first traffic profile and activation information indicating a time or time period at which the first plurality of nodes are to apply the first traffic profile;

transmitting, according to the transmit information, the activation information and the first traffic profile to each of the first plurality of nodes provided on the network; and receiving duplicated packets from the first plurality of nodes, the duplicated packets including packets which have been duplicated from packets which are captured by the first plurality of nodes and satisfy the first traffic profile.

2. The method of claim 1, wherein
the one or more parameters include at least one of a port, a protocol, or an attribute associated with the packets.

3. The method of claim 1, wherein the user interface includes a pop-up window or pull-down menu configured to display the first plurality of user interface elements.

4. The method of claim 1, wherein the activation information indicates a period of time during which the first plurality of nodes are to duplicate packets which are captured by the first plurality of nodes and satisfy the first traffic profile, the period of time including a start time and an end time.

5. The method of claim 1, wherein
the activation information indicates a time period at which the first plurality of nodes are to apply the first traffic profile and duplicate packets which are captured by the first plurality of nodes and satisfy the first traffic profile, the time period including a start time and an end time, and
the transmit information indicates the first traffic profile is to be transmitted to the first plurality of nodes at the start time.

6. The method of claim 1, wherein receiving the duplicated packets from the first plurality of nodes comprises receiving, by a data collector via a network tunnel, the duplicated packets from the first plurality of nodes.

7. The method of claim 1, further comprising:

indexing the duplicated packets according to metadata of the duplicated packets, the metadata of the duplicated packets including at least one of a source internet protocol (IP) address, a destination IP address, a source port, or destination port, associated with each of the duplicated packets; and generating pointers for a database referencing the duplicated packets, based on the indexing.

8. The method of claim 7, wherein:

providing the user interface, for presentation on the display of the computing device, comprises providing the user interface to present data associated with the duplicated packets based on the pointers for the database; and outputting real-time information associated with duplicated packets of a first node among the first plurality of nodes based on receiving a selection, via the user interface, of a user interface element representing the first node.

9. The method of claim 7, wherein:

providing the user interface, for presentation on the display of the computing device, comprises providing the user interface to present data associated with the duplicated packets based on the pointers for the database; and outputting information for a previous time-period associated with duplicated packets of a first node among the first plurality of nodes based on receiving a selection, via the user interface, of a user interface element representing the first node and another user interface element associated with the previous time-period.

10. The method of claim 1, further comprising:

providing the user interface, for presentation on the display of the computing device, to display a third plurality of user interface elements representing a second plurality of nodes provided on the network;

receiving, via one or more fourth inputs to the user interface, a selection of the third plurality of user interface elements representing the second plurality of nodes as nodes from the network which are to receive a second traffic profile;

receiving, via one or more fifth inputs to the user interface, a further selection of the second plurality of user interface elements to define the second traffic profile, wherein the second traffic profile includes one or more parameters of packets which are to be captured by the second plurality of nodes at least partially concurrently with packets which are to be captured by the first plurality of nodes;

transmitting the second traffic profile to each of the second plurality of nodes provided on the network; and receiving duplicated packets from the second plurality of nodes, the duplicated packets including packets which have been duplicated from packets which are captured by the second plurality of nodes and satisfy the second traffic profile.

11. The method of claim 10, wherein:

the one or more second inputs indicate a first destination internet protocol (IP) address associated with a data collector which is to receive the duplicated packets from the first plurality of nodes and the one or more fourth inputs indicate a second destination IP address associated with the data collector which is to receive the duplicated packets from the second plurality of nodes; and the first traffic profile includes the first destination IP address associated with the data collector and the second traffic profile includes the second destination IP address associated with the data collector.

12. The method of claim 11, wherein
the first traffic profile is associated with packets relating to user plane traffic, and the second traffic profile is associated with packets relating to control plane traffic.

13. The method of claim 1, further comprising providing, for presentation on the display of the computing device, a portal including the user interface.

14. A server computing system, comprising:
a data collector;
at least one memory configured to store instructions; and
at least one processor configured to execute the instructions stored in the at least one memory to:
    provide a user interface, for presentation on a display of a computing device, to display a first plurality of user interface elements representing a plurality of nodes provided on a network and a second plurality of user interface elements for defining a traffic profile which includes one or more parameters of packets which are to be captured by the plurality of nodes provided on the network,
    receive, via one or more first inputs to the user interface, a selection of the first plurality of user interface elements representing the plurality of nodes as nodes from the network which are to receive the traffic profile;
    receive, via one or more second inputs to the user interface, a selection of the second plurality of user interface elements to define the traffic profile;
    receive, via one or more third inputs to the user interface, transmit information defining a time or a time period at which the plurality of nodes are to receive the traffic profile and activation information indicating a time or time period at which the plurality of nodes are to apply the traffic profile;
    transmit, according to the transmit information, the activation information and the traffic profile to each of the plurality of nodes provided on the network, and
    receive, at the data collector, duplicated packets from the plurality of nodes, the duplicated packets including packets which have been duplicated from packets which are captured by the plurality of nodes and satisfy the traffic profile.

15. The server computing system of claim 14, wherein the one or more parameters include at least one of a port, a protocol, or an attribute associated with a packet.

16. The server computing system of claim 14, wherein the activation information indicates a period of time during which the plurality of nodes are to duplicate packets which are captured by the plurality of nodes and satisfy the traffic profile, wherein the period of time includes a start time and an end time, and the traffic profile indicates a destination internet protocol (IP) address associated with the data collector.

17. The server computing system of claim 16, wherein the transmit information indicates the traffic profile is to be transmitted to the plurality of nodes at the start time, and the at least one processor is configured to transmit the traffic profile to the plurality of nodes at the start time.

18. The server computing system of claim 14, further comprising a database, wherein the at least one processor is configured to:
    index the duplicated packets received by the data collector according to metadata of the duplicated packets, the metadata of the duplicated packets including at least one of a source internet protocol (IP) address, a destination IP address, a source port, or destination portion, associated with each of the duplicated packets, and
    generate pointers for the database referencing the duplicated packets received at the data collector, based on the indexing of the duplicated packets.

19. The server computing system of claim 18, wherein the at least one processor is configured to:
    provide the user interface, for presentation on the display of the computing device, to present data associated with the duplicated packets received by the data collector based on the pointers for the database, and
    output real-time information associated with duplicated packets of a node among the plurality of nodes, based on receiving a selection, via the user interface, of a user interface element representing the node, or
    output information for a previous time-period associated with duplicated packets of the node among the plurality of nodes, based on receiving a selection, via the user interface, of the user interface element representing the node and another user interface element associated with the previous time-period.

20. A non-transitory computer-readable storage medium that includes executable instructions configured to cause one or more processor devices of a server computing system to:
    provide a user interface, for presentation on a display of a computing device, to display a first plurality of user interface elements representing a plurality of nodes provided on a network and a second plurality of user interface elements for defining a traffic profile which includes one or more parameters of packets which are to be captured by the plurality of nodes provided on the network;
    receive, via one or more first inputs to the user interface, a selection of the first plurality of user interface elements representing the plurality of nodes as nodes from the network which are to receive the traffic profile;
    receive, via one or more second inputs to the user interface, a selection of the second plurality of user interface elements to define the traffic profile;
    receive, via one or more third inputs to the user interface, transmit information defining a time or a time period at which the plurality of nodes are to receive the traffic profile and activation information indicating a time or time period at which the plurality of nodes are to apply the traffic profile;
    transmit, according to the transmit information, the activation information and the traffic profile to each of the plurality of nodes provided on the network; and
    receive duplicated packets from the plurality of nodes, the duplicated packets including packets which have been duplicated from packets which are captured by the plurality of nodes and satisfy the traffic profile.

* * * * *